May 5, 1964  F. LYON ETAL  3,131,487
PHOTOGRAPHIC MISSION SIMULATOR
Filed Feb. 10, 1961
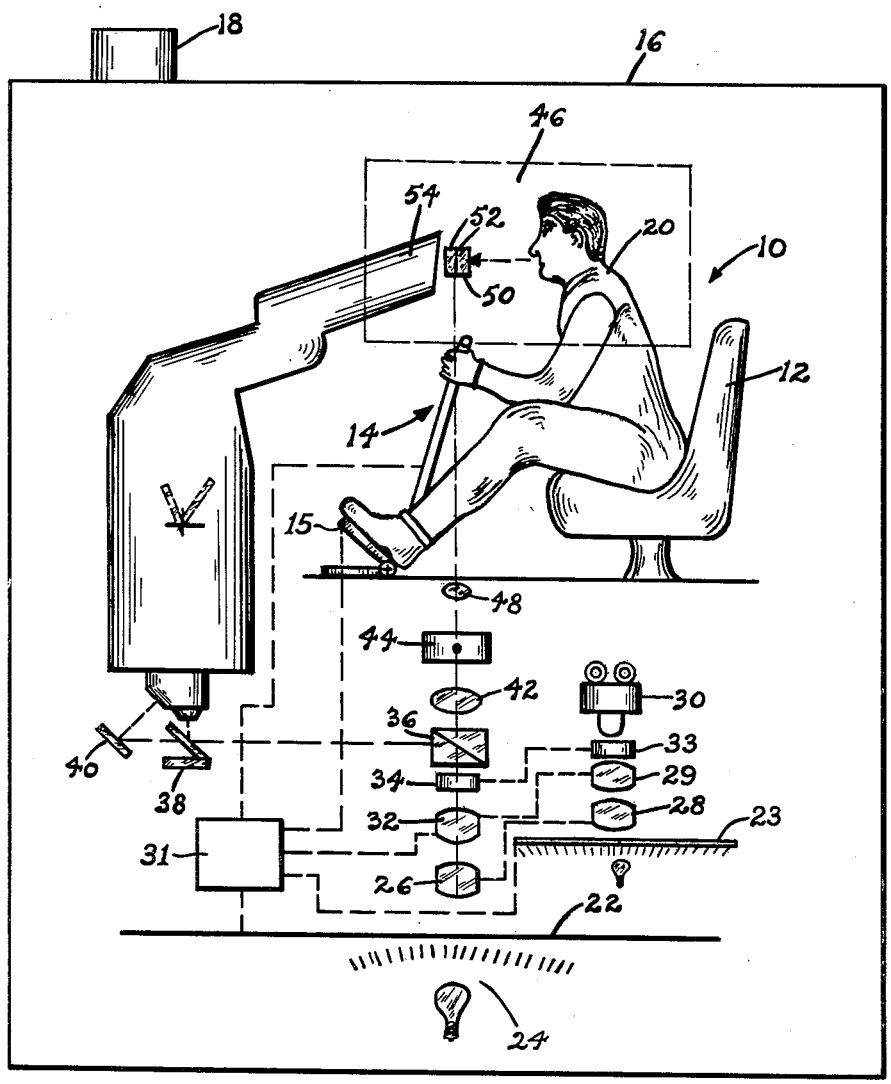
INVENTORS
FLOYD LYON
THEODORE ARONSON
BY
Lawrence S. Epstein
ATTORNEY

3,131,487
PHOTOGRAPHIC MISSION SIMULATOR
Floyd Lyon, Brookville, and Theodore Aronson, Glen Cove, N.Y., assignors, by mesne assignments, to the United States of America as represented by the Secretary of the Navy
Filed Feb. 10, 1961, Ser. No. 88,588
3 Claims. (Cl. 35—12)

The present invention relates to pilot trainers and is more particularly concerned with the provision of an improved pilot trainer of the type of which a scene observed by the operator shifts when the airplane controls are manipulated, and further in which the scene observed by the pilot appears as if the pilot is flying at different distances above the ground.

An object of the present invention is to provide an improved training device for simulating the airborne presentation in a ground based trainer for photographic missions.

A further object of the present invention is to provide a novel training device for simulating airborne presentations to a pilot trainee by means of a novel optical system.

A further object of the present invention is to provide an improved photographic mission pilot trainer which presents the terrain at different distances from the ground.

Other objects and many of the attendant advantages of this invention will be readily appreciated as the same becomes better understood by reference to the following detailed description when considered in connection with the single figure which shows all parts of the invention.

Referring now to the figure, the overall body of the trainer 10 is a cockpit from the desired aircraft. This cockpit includes the seat 12 and all of the necessary controls i.e., the joystick 14 and the speed control 15, instruments and dials. The cockpit is enclosed in a light tight enclosure 16. Adequate ventilating and air conditioning facilities 18 are provided external to the light tight enclosure 16. The training terrain to be viewed by the pilot trainee 20 is in the form of a high resolution film transparency 22. The light source for the trainer to illuminate the film transparency can either be ambient light or an artificial source of light which has been collimated by means of appropriate condenser lenses. It is placed below the transparency terrain at 24. The terrain presentation 22 is a photograph at about 200,000 to 1 on a glass plate for minimum distortion. Directly above the terrain presentation is a collimating system which comprises a turret of lenses to simulate a presentation to the trainee of different altitudes, i.e., 10,000 feet, 20,000 feet, 30,000 feet and 60,000 feet in the preferred embodiment. The positioning of this turret for the proper lens is done manually. The lens system 26 for simulating the presentations to the pilot trainee is coupled directly to a lens turret for the camera presentation system 28. The camera is located above its optical system in the figure. Directly above the optical lens system 26 is the prism system 32. The prism system comprises a dove prism which is rotated to give the desired aircraft heading, a prism which is rotated to simulate roll and a prism which is used to simulate pitch. Directly over the prism system is a coupled variable magnification telescope 34, which is controlled by the altitude variations at which the student trainee flies on his actual flight in the trainer. The variable magnification telescope is utilized to maintain the presentation at the proper size which would be presented in actual flight in an aircraft. The transparency 22 is moved in accordance with the aircraft controls 14 and 15 by motor means 31. The aircraft controls also determine the movement of the prism system 32 which simulates the pitch and roll of the operational aircraft.

Directly over the variable magnification telescope is a ray splitter 36 which is a split mirror which takes part of the terrain presentation and reflects it towards the down looking portion of the view finder 38 and the forward looking view finder 40. The portion of the rays which are not reflected by this split mirror 36 go straight up and pass through the first objective lens 42 and then into a second beam splitter 44. The second beam splitter is used for the purpose of projecting the correct portion of the terrain presentation to the proper part of the translucent viewing screen 46. The scond beam splitter 44 projects left hand terrain to the left hand viewing screen and the right hand terrain to the right hand viewing screen. The second split of the light rays passes through the second objective lens 48 which takes the light rays and reflects them off a lower mirror 50 then to an upper mirror 52 and then back to the translucent screen.

The translucent screen is located outside the actual window in the cockpit. The pilot trainee then will simultaneously view the terrain image within the view finder of his camera 54 and the terrain simulated on the translucent screen 46 for training in photographic missions.

In operation, the trainee can manipulate the simulator controls and the simulated terrain will appear in both the camera viewer 54 and the screen 46 just as they will appear in an actual photographic mission. The terrain visible to the trainee will also be presented to the camera 30 for photographing. The scene which is presented to the camera 30 is the same as that viewed by the trainee because the camera optical system 38, 29 and 33 is respectively coupled to the terrain projection optical system parts 26, 32 and 34. Terrain presentation slide 23 is coupled to presentation slide 22 and provides the same presentation to camera 30 as does slide 22 to the trainee. Subsequent viewing of the film in camera 30 after it is developed will show the accuracy of the trainee's accomplishment of the photographic mission.

Obviously many modifications and variations of the present invention are possible in the light of the above teachings. It is therefore to be understood that within the scope of the appended claims the invention may be practiced otherwise than as specifically described.

What is claimed is:

1. A training device for the simulation of photographic reconnaissance missions comprising an aircraft trainer having aircraft controls in combination with a light source, a reduced transparency of ground terrain mounted within said trainer, said light source being operatively connected to illuminate said transparency and provide a terrain image, a prism system and variable magnification means operative with said terrain transparency image for changing the apparent size of said image, beam splitting means operative with said transparency image for splitting said transparency image into a first and a second terrain image, a lens system and photographic projection and screen means operative with said beam splitting means for projection of said first terrain image onto said screen means for viewing thereof, and simulated view finder means operative with said beam splitting means for view finder presentation of said second terrain image.

2. The combination of claim 1 wherein said prism means comprise a first, a second and a third prism operatively interconnected with rotation means, said rotation means being operatively connected to the simulated trainer controls whereby said first prism moves the terrain image to simulate aircraft heading, said second prism being operatively connected to said trainer controls whereby said second prism moves the terrain image to simulate aircraft roll, and said third prism being operatively connected to said simulated trainer controls whereby said third prism moves the terrain image to simulate aircraft pitch.

3. The combination of claim 1 wherein said simulated view finder means operative with said second terrain image comprises a lens system and projection means, said projection means being operatively coupled to said lens system and said projection means being operative with said first terrain image, whereby said view finder and screen projected images are varied simultaneously to simulate actual flight conditions.

References Cited in the file of this patent

UNITED STATES PATENTS

| | | |
|---|---|---|
| 2,089,703 | May | Aug. 10, 1937 |
| 2,120,596 | Avey | June 14, 1938 |
| 2,350,351 | Grunberg | June 6, 1944 |
| 2,413,633 | Jones | Dec. 31, 1946 |
| 2,591,752 | Wicklund | Apr. 8, 1952 |
| 2,938,279 | Hemstreet | May 31, 1960 |

FOREIGN PATENTS

| | | |
|---|---|---|
| 554,518 | Canada | Mar. 18, 1958 |
| 577,566 | Great Britain | May 23, 1946 |
| 662,288 | France | Aug. 5, 1929 |